(12) United States Patent
Tovani

(10) Patent No.: US 10,793,043 B2
(45) Date of Patent: Oct. 6, 2020

(54) VEHICLE-MOUNTED EXPANDABLE TABLE SYSTEM

(71) Applicant: Ernest Peter Tovani, Centennial, CO (US)

(72) Inventor: Ernest Peter Tovani, Centennial, CO (US)

( * ) Notice: Subject to any disclaimer, the term of this patent is extended or adjusted under 35 U.S.C. 154(b) by 25 days.

(21) Appl. No.: 16/222,337

(22) Filed: Dec. 17, 2018

(65) Prior Publication Data

US 2019/0202332 A1 Jul. 4, 2019

Related U.S. Application Data

(60) Provisional application No. 62/612,795, filed on Jan. 2, 2018.

(51) Int. Cl.
*B60N 3/00* (2006.01)
*A47B 3/10* (2006.01)

(52) U.S. Cl.
CPC ............... *B60N 3/001* (2013.01); *A47B 3/10* (2013.01)

(58) Field of Classification Search
CPC .......... B60N 3/001; B60N 3/002; A47B 3/10; A47B 5/00
USPC .............. 108/42, 44, 45, 152, 48, 33, 34, 35
See application file for complete search history.

(56) References Cited

U.S. PATENT DOCUMENTS

| | | | |
|---|---|---|---|
| 1,317,895 A * | 10/1919 | Rudy | A47B 3/10 190/12 R |
| 2,246,813 A | 6/1941 | Preston | |
| 2,249,845 A | 7/1941 | Mitchell | |
| 2,451,275 A * | 10/1948 | Cercownay | B60N 3/001 108/34 |
| 2,471,730 A | 5/1949 | Doerr | |
| 2,545,269 A | 3/1951 | Ford | |
| 2,867,471 A | 1/1959 | Coon | |
| 3,159,114 A * | 12/1964 | Haunost | A47B 3/087 108/38 |
| 3,333,594 A | 8/1967 | Moss | |
| 3,338,620 A * | 8/1967 | Cauvin | B60N 3/001 296/37.14 |
| 3,394,666 A | 7/1968 | Pearlman | |
| 3,410,598 A | 11/1968 | Donovan et al. | |
| 4,089,554 A | 5/1978 | Myers | |

(Continued)

FOREIGN PATENT DOCUMENTS

JP 405319164 A 12/1993

*Primary Examiner* — Jose V Chen
(74) *Attorney, Agent, or Firm* — Faegre Drinker Biddle & Reath LLP

(57) ABSTRACT

A vehicle-mounted table system includes a table portion that is movable from an expanded configuration to a storage configuration and vice versa. The table portion includes a first table element, a second table element, and a third table element. A first hinge couples the first table element to the second table element, and the first hinge facilitates pivoting motion of the second table element relative to the first table element about a first axis. A compound hinge assembly couples the second table element to the third table element. The compound hinge assembly includes a hinge table element, a second hinge, and a third hinge that facilitate pivoting the second table element relative to the hinge table element about a second axis and the third table element relative to the hinge table element about a third axis. The second and third axes are substantially parallel to the first axis.

14 Claims, 10 Drawing Sheets

(56) References Cited

U.S. PATENT DOCUMENTS

| | | | |
|---|---|---|---|
| 4,236,461 A | 12/1980 | Barksdale | |
| 4,375,306 A | 3/1983 | Linder | |
| 4,452,151 A | 6/1984 | Jarrard | |
| 4,455,948 A | 6/1984 | Torres | |
| 4,544,195 A | 10/1985 | Gunn | |
| 4,643,103 A * | 2/1987 | Jorgensen | A47B 3/087 108/128 |
| 4,995,322 A * | 2/1991 | Frederick | A47B 5/06 108/38 |
| 5,040,467 A * | 8/1991 | King | B60P 3/32 108/42 |
| 5,136,953 A | 8/1992 | Schmidt | |
| 5,143,417 A | 9/1992 | Philley et al. | |
| 5,312,149 A | 5/1994 | Boone | |
| 5,358,298 A | 10/1994 | Fate | |
| 5,479,866 A | 1/1996 | Rae | |
| 5,533,771 A * | 7/1996 | Taylor | B60P 1/435 108/44 |
| 5,575,521 A | 11/1996 | Speis | |
| 5,582,456 A | 12/1996 | Hammond | |
| 5,660,425 A | 8/1997 | Weber | |
| 5,730,066 A | 3/1998 | Auten et al. | |
| 5,771,815 A | 6/1998 | Leftwich | |
| 5,820,189 A | 10/1998 | Tew | |
| 5,823,595 A | 10/1998 | Tronco | |
| 5,934,726 A | 8/1999 | Bossett | |
| 6,045,172 A | 4/2000 | Thomas et al. | |
| 6,145,447 A | 11/2000 | Henderson | |
| 6,161,486 A | 12/2000 | Boots | |
| 6,179,367 B1 | 1/2001 | Bowen | |
| 6,193,294 B1 | 2/2001 | Disner et al. | |
| 6,250,702 B1 | 6/2001 | Eipper | |
| 6,314,891 B1 | 11/2001 | Larson | |
| 6,412,424 B1 | 7/2002 | Dirks | |
| 6,431,629 B1 | 8/2002 | Emery | |
| 6,467,417 B1 | 10/2002 | Guyot et al. | |
| 6,739,269 B1 | 5/2004 | Benton | |
| 6,811,207 B2 | 11/2004 | Dalpizzol et al. | |
| 6,871,896 B1 | 3/2005 | Owen | |
| 6,929,302 B1 | 8/2005 | Demick et al. | |
| 7,309,202 B1 * | 12/2007 | Anderson | B60P 1/431 108/44 |
| 7,377,569 B2 | 5/2008 | Taylor et al. | |
| 7,628,439 B1 | 12/2009 | Strong | |
| 8,256,818 B1 | 9/2012 | Tovani | |
| 8,408,145 B2 * | 4/2013 | Chen | A47B 1/04 108/128 |
| 8,555,788 B2 * | 10/2013 | Kleinklaus | A47B 3/087 108/115 |
| 8,651,030 B2 * | 2/2014 | Coffman | A47B 3/0911 108/169 |
| 8,991,894 B2 * | 3/2015 | Smith | B62D 33/10 296/100.09 |
| 10,035,465 B2 * | 7/2018 | Waddell | B60R 5/045 |
| 10,532,683 B1 * | 1/2020 | Bowman | B60J 7/141 |
| 2002/0078861 A1 | 6/2002 | Davis | |
| 2003/0057244 A1 | 3/2003 | Dorety | |
| 2003/0075943 A1 | 4/2003 | Kirchhoff | |
| 2004/0032142 A1 * | 2/2004 | Sherrer | B60P 1/435 296/61 |
| 2004/0084072 A1 | 5/2004 | Tien | |
| 2005/0092799 A1 | 5/2005 | Morris | |
| 2008/0083352 A1 | 4/2008 | Tovani | |

* cited by examiner

VEHICLE-MOUNTED EXPANDABLE TABLE SYSTEM

CROSS-REFERENCE TO RELATED APPLICATION

The present application claims the benefit of and priority to, under 35 U.S.C. § 119(e), U.S. Provisional Application Ser. No. 62/612,795, filed Jan. 2, 2018, entitled VEHICLE-MOUNTED EXPANDABLE TABLE SYSTEM, which is hereby incorporated by reference in its entirety for all purposes.

TECHNICAL FIELD

The present disclosure generally relates to vehicle-mounted expandable table systems. More specifically, the present disclosure relates to expandable table systems that are coupled to and storable in a compact storage configuration in a cargo space of a vehicle.

BACKGROUND

Various vehicle-mounted expandable table systems have been developed. However, such table systems typically occupy relatively valuable and/or large amounts of cargo space in vehicles. Furthermore, the movable nature of such table systems, which facilitates their expandability, also permits significant movement and vibration during vehicle transit. Accordingly, there is a continuing need for improvements to such table systems.

SUMMARY

A vehicle-mounted table system according to some embodiments includes a base portion that is configured to couple to the vehicle within the cargo space of the vehicle. A table portion is coupled to the base portion, and the table portion is movable relative to the base portion from an expanded configuration to a storage configuration and vice versa. The table portion includes a first table element coupled to the base portion, a second table element, and a third table element. A first hinge couples the first table element to the second table element, and the first hinge facilitates pivoting the second table element relative to the first table element about a first axis. A compound hinge assembly couples the second table element to the third table element. The compound hinge assembly includes a hinge table element, a second hinge, and a third hinge. The second hinge couples the second table element to the hinge table element. The second hinge facilitates pivoting the second table element relative to the hinge table element about a second axis, the second axis being substantially parallel to the first axis. The third hinge couples the hinge table element to the third table element. The third hinge facilitates pivoting the third table element relative to the hinge table element about a third axis, the third axis being substantially parallel to the first axis. At least one support element is coupled to the table portion and is configured to engage the ground.

BRIEF DESCRIPTION OF THE DRAWINGS

The accompanying drawings are incorporated into and form a part of the specification to illustrate one or more examples of the present disclosure, to include one or more embodiments as described herein. These drawings, together with the description, explain the principles of the disclosure. The drawings simply illustrate preferred and alternative examples of how the embodiments may be made and used and are not to be construed as limiting the disclosure to only the illustrated and described exemplary embodiments. Further features and advantages will become apparent from the following, more detailed, description of the various aspects and embodiments of the disclosure, as illustrated by the drawings referenced below.

Figure 1:
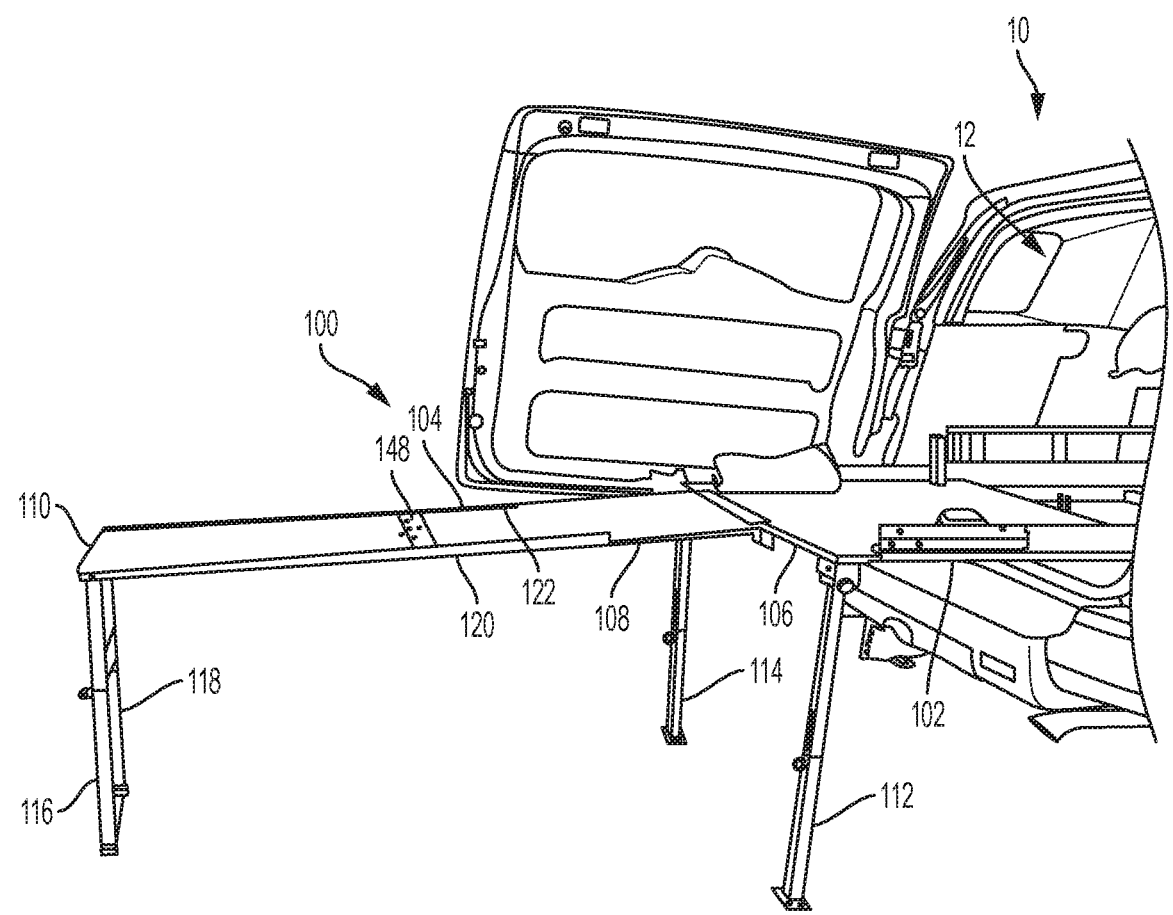
FIG. 1 is a partial perspective view of an exemplary embodiment of a vehicle-mounted table system according to the present disclosure; the table system is shown in an expanded configuration.

Corresponding reference characters indicate corresponding parts throughout the several views. It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof, as well as additional items.

This disclosure is directed to expandable table systems that are coupled to and storable in a storage configuration in a cargo space of a vehicle. In the storage configuration, the table systems are horizontally disposed and thereby occupy a relatively small amount of space and experience reduced vibrations during vehicle transit compared to other vehicle-mounted table systems.

FIG. 1 illustrates an exemplary embodiment of a vehicle-mounted table system 100 according to the present disclosure. The table system 100 is coupled to and moveable relative to a vehicle 10. More specifically, the table system 100 is movable from an expanded configuration in which the table system 100 is at least partially disposed outside of the vehicle 10 (as shown in FIG. 1) to a storage configuration (shown elsewhere) in which the table system 100 is relatively-compactly disposed within the cargo space 12 of the vehicle 10, and vice versa. Generally, the table system 100 includes a base portion 102 that couples to the vehicle 10 within the cargo space 12. The base portion 102 movably couples to a table portion 104, which includes a plurality of relatively-movable table elements (more specifically, a first table element 106, a second table element 108, and a third table element 110). The table portion 104 movably couples to a plurality of height-adjustable, ground-engaging support elements (more specifically, a first support element 112, a second support element 114, a third support element 116, and a fourth support element 118). The table portion 104 also detachably couples to side support brackets 120 and 122 that secure the second and third table elements 108 and 110, as well as the hinge table element 148 located between the second and third table elements 108 and 110, in the expanded configuration. These components and the configurations of the table system 100 are described in further detail below.

Figure 2:
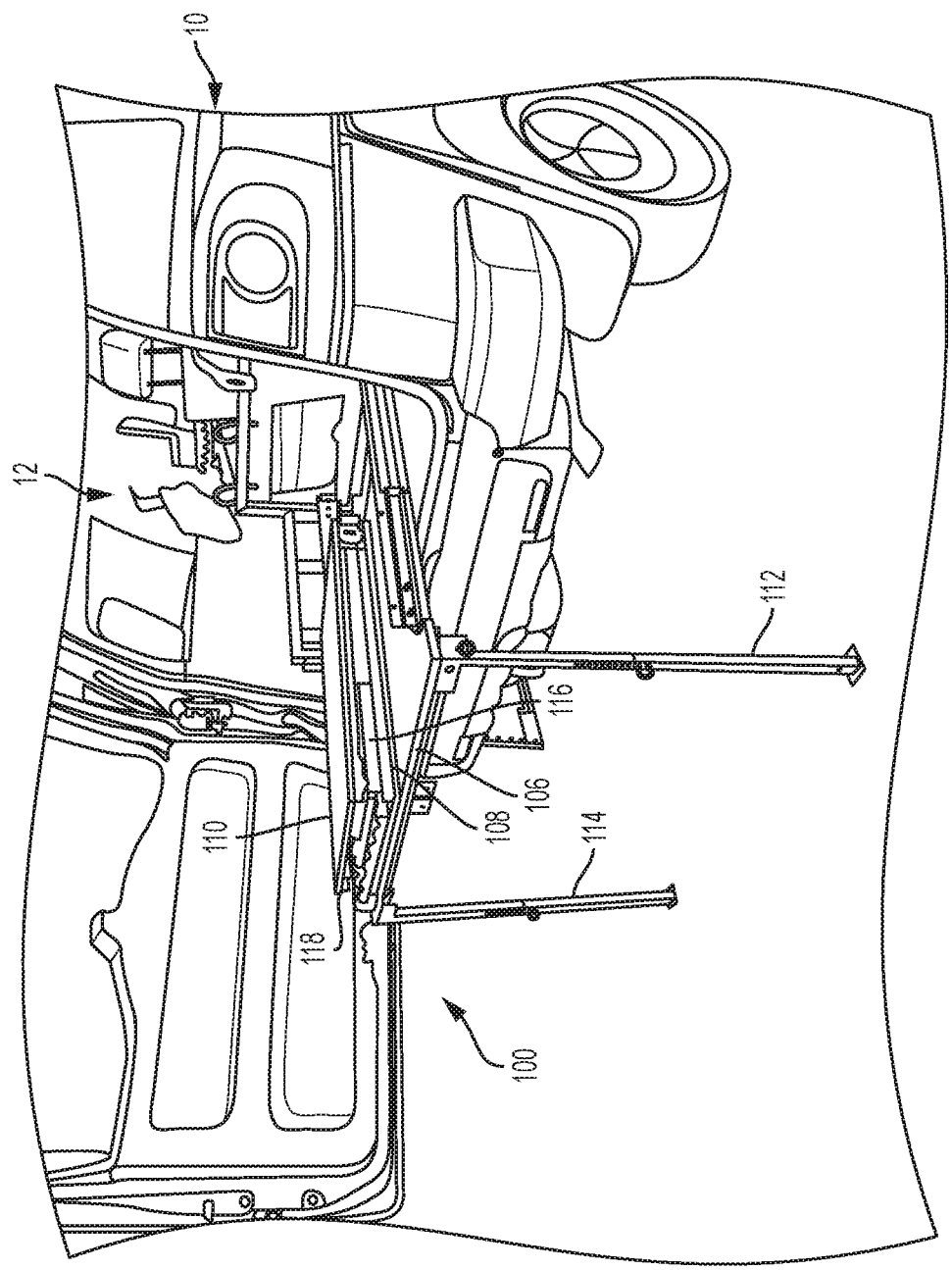
FIG. 2 is a partial perspective view of the table system of FIG. 1 in an intermediate configuration between the expanded configuration and a storage configuration.

FIG. 2 illustrates the table system 100 in a first intermediate configuration between the expanded configuration and the storage configuration. In the first intermediate configuration, the table elements 106, 108, and 110 and the third and fourth support elements 116 and 118 are positioned in a manner that permits fitting in the cargo space 12 of the vehicle 10 in the storage configuration. More specifically, the table elements 106, 108, and 110 are folded relative to each other and positioned in a relatively short stack, and the third and fourth support elements 116 and 118 are folded and positioned between the second and third table elements 108 and 110. However, the first and second support elements 112 and 114 are positioned to engage the ground and are not positioned in a manner that permits fitting in the cargo space 12 of the vehicle 10 in the storage configuration.

Figure 3:
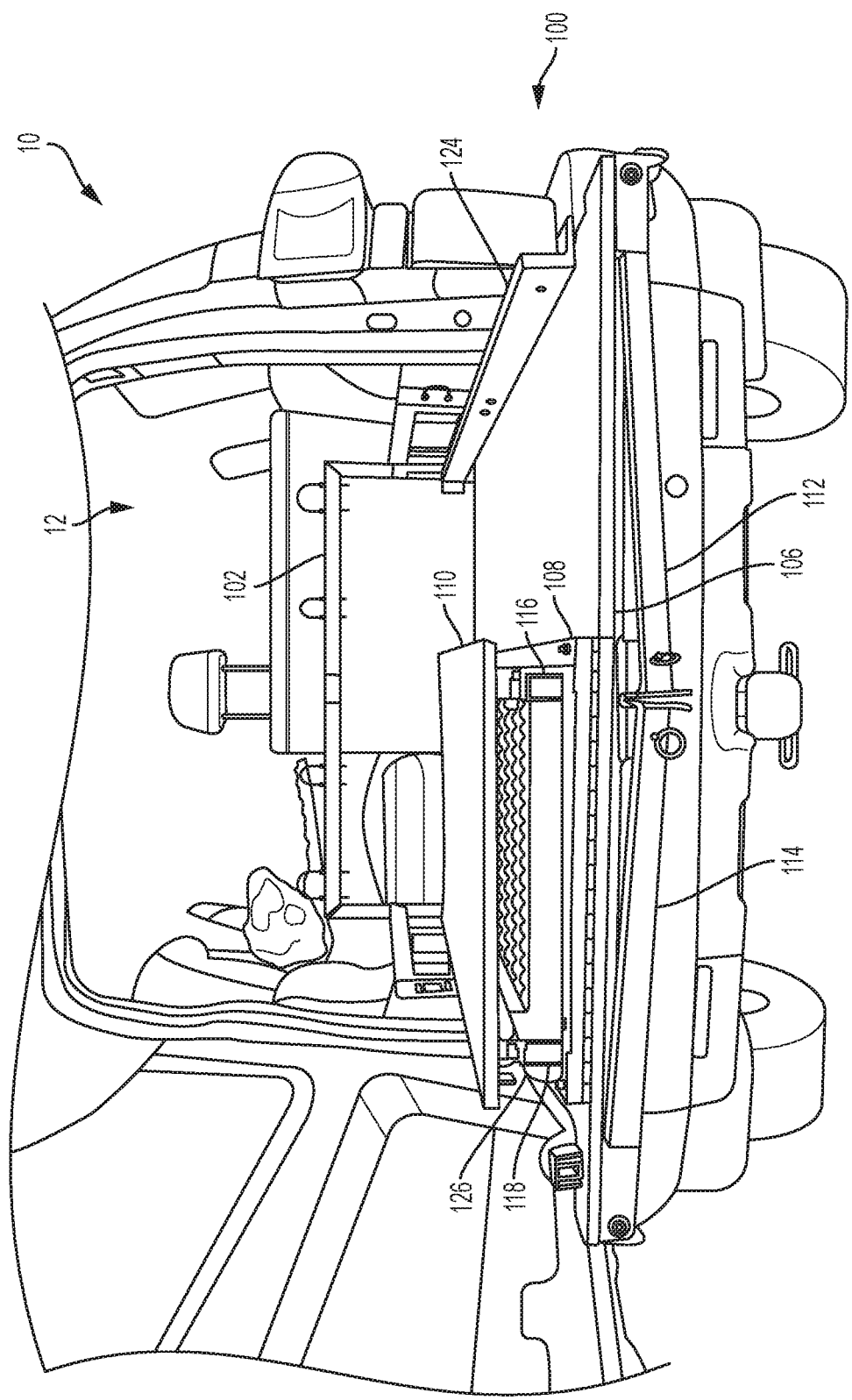
FIG. 3 is a partial perspective view of the table system of FIG. 1 in another intermediate configuration between the expanded configuration and the storage configuration.

FIG. 3 illustrates the table system 100 in a second intermediate configuration between the expanded configuration and the storage configuration. In the second intermediate configuration, the table elements 106, 108, and 110 and the third and fourth support elements 116 and 118 are positioned in the same manner as the first intermediate configuration. Additionally, the first and second support elements 112 and 114 are positioned in a manner that permits fitting in the cargo space 12 of the vehicle 10 in the storage configuration. More specifically, the first and second support elements 112 and 114 are pivoted away from the ground and toward the table elements 106, 108, and 110. In the second intermediate configuration, the table elements 106, 108, and 110 and the support elements 112, 114, 116, and 118 may be translated relative to the base portion 102 toward the cargo space 12 (that is, in a forward/backward direction of the vehicle 10) to reconfigure the table system 100 to the storage configuration. To facilitate this translation, sliding elements 124 and 126 may couple the first table element 106 to the base portion 102.

Figure 4:
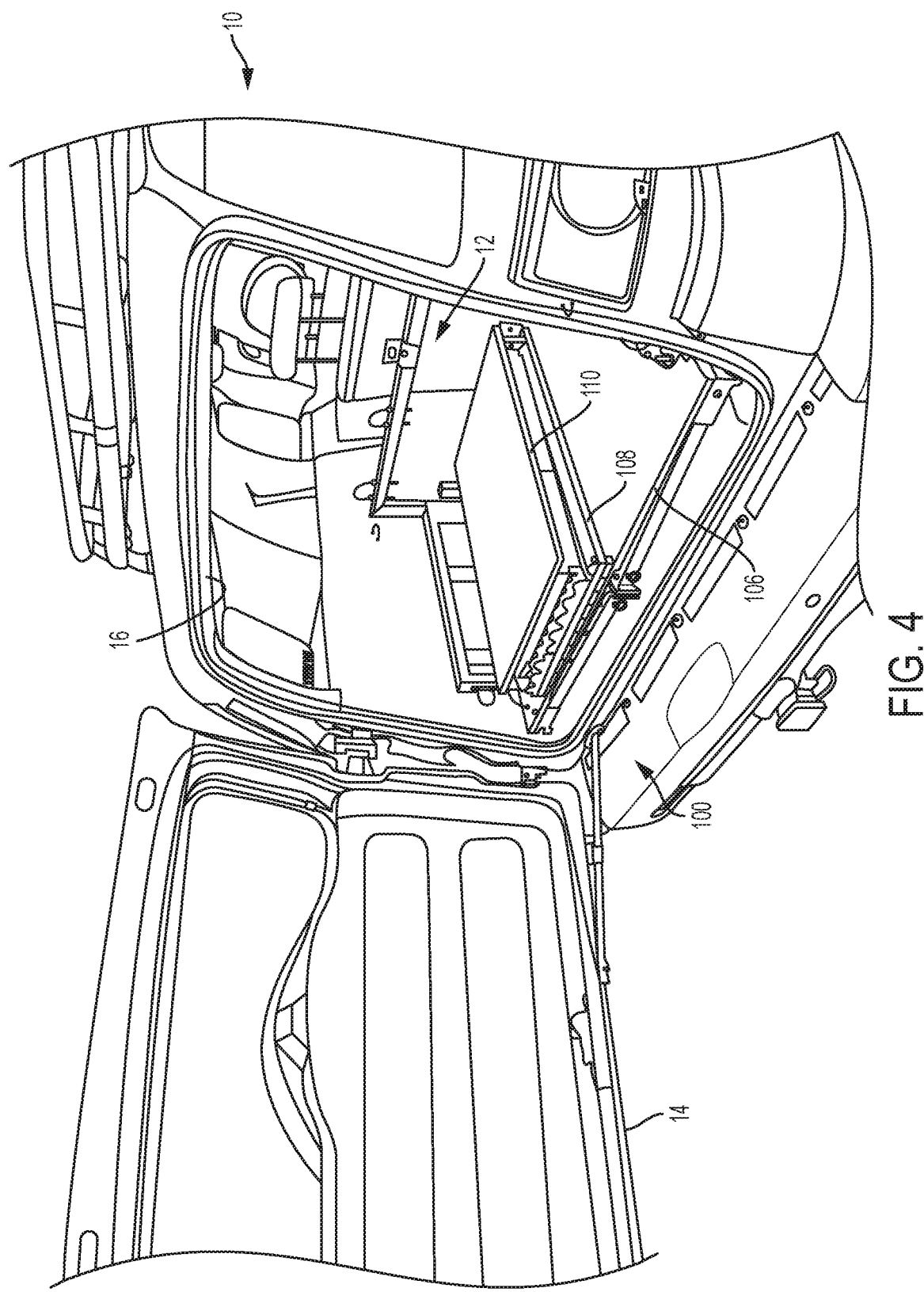
FIG. 4 is a partial perspective view of the table system of FIG. 1 in the storage configuration.
Figure 5:
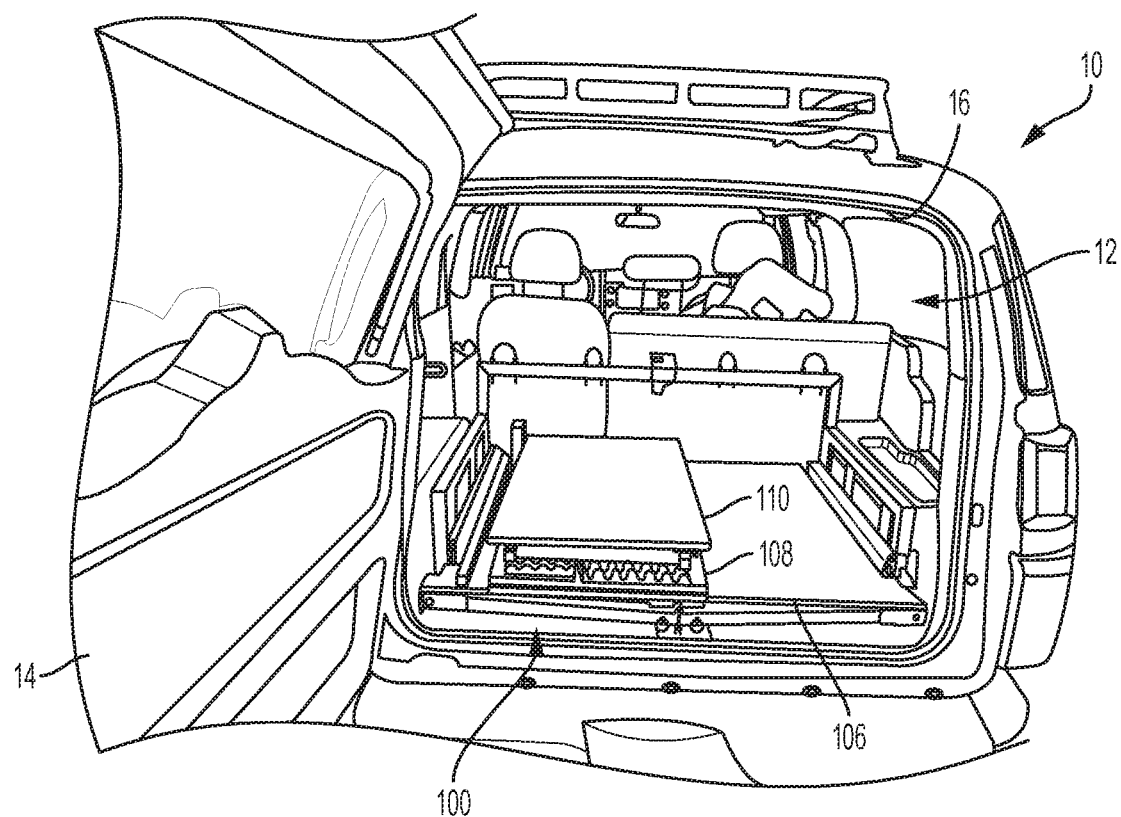
FIG. 5 is another partial perspective view of the table system of FIG. 1 in the storage configuration.

FIGS. 4 and 5 illustrate the table system 100 in the storage configuration. In the storage configuration, the table system 100 is disposed within the cargo space 12 of the vehicle 10, which permits the rear door 14 (or a hatch, tailgate, a liftgate, or the like) of the vehicle 10 to close over the rear opening 16 of the vehicle 10. In at least one embodiment, in the storage configuration, the table elements 106, 108, and 110 are disposed in substantially parallel planes (that is, parallel±10 degrees) relative to one another. Those planes may be substantially parallel (that is, parallel±10 degrees) to the horizontal plane of the vehicle 10. In contrast, in the storage configuration, the hinge table element 148 is not situated substantially parallel (that is, parallel±10 degrees) to the table elements 106, 108, and 110. In at least one embodiment, in the storage configuration the hinge table element 148 is located substantially perpendicular (that is, perpendicular±10 degrees) to the table elements 106, 108, and 110.

Figure 6:
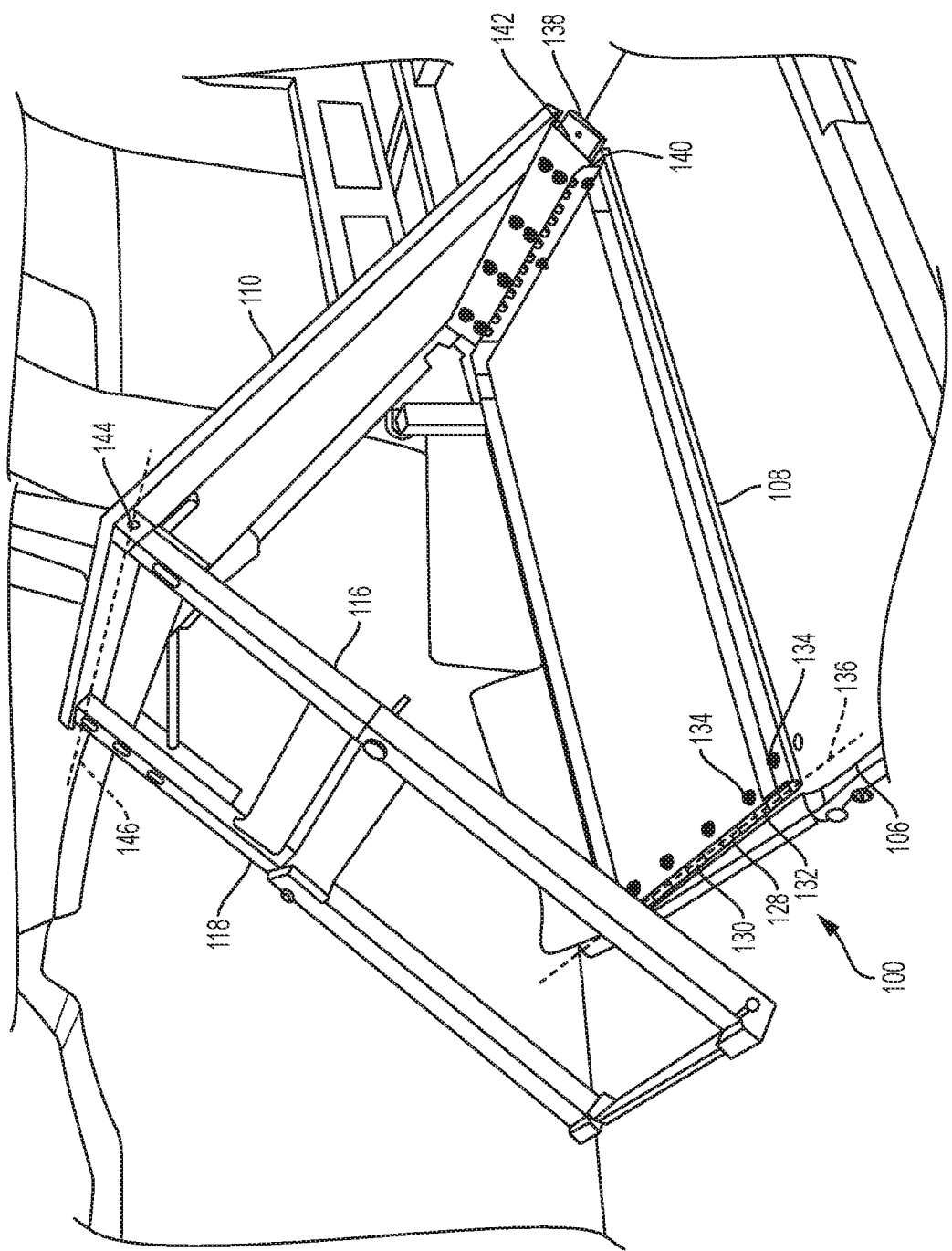
FIG. 6 is a partial perspective view of a table portion and support elements of the table system of FIG. 1 in an intermediate configuration between the expanded configuration and the storage configuration.
Figure 7:
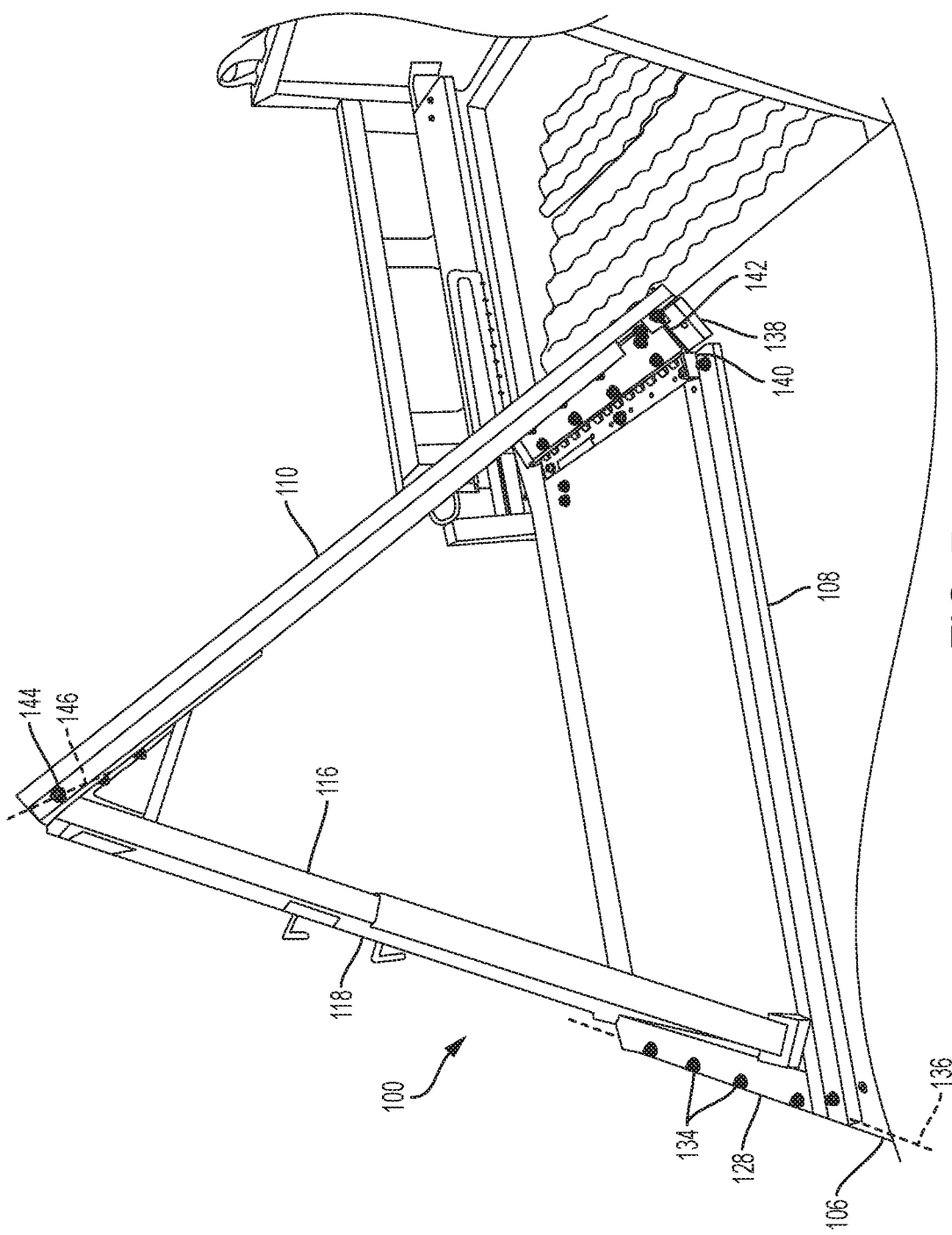
FIG. 7 is another partial perspective view of the table portion and the support elements of the table system of FIG. 1 in another intermediate configuration between the expanded configuration and the storage configuration.

FIGS. 6-10 illustrate further details of the components of the table system 100, and the table system 100 is shown in various intermediate configurations between the expanded configuration and the storage configuration. FIGS. 6 and 7 illustrate hinges that pivotably couple the table elements 106, 108, and 110 and the third and fourth support elements 116 and 118. More specifically, a first hinge 128 pivotably couples the first and second table elements 106 and 108. In at least one embodiment, the first hinge 128 is defined by interdigitating brackets 130 and 132 that couple to the first and second table elements 106 and 108, respectively, via fasteners 134. The first hinge 128 facilitates pivoting motion of the second table element 108 relative to the first table element 106 about a first axis 136 that is substantially horizontal and substantially perpendicular to the forward/backward direction of the vehicle 10. A compound hinge assembly 138, which includes a second hinge 140 and a third hinge 142, pivotably couples the second and third table elements 108 and 110. The compound hinge assembly 138 is described in further detail below. A fourth hinge 144 pivotably couples the third table element 110 to the third and fourth support elements 116 and 118. The fourth hinge 144 facilitates pivoting motion of the third and fourth support elements 116 and 118 relative to the third table element 110 about a fourth axis 146 that is substantially parallel to the first axis 136 (that is, parallel±10 degrees). Stated another way, the fourth axis 146 is substantially horizontal and substantially perpendicular to the forward/backward direction of the vehicle 10.

Figure 8:
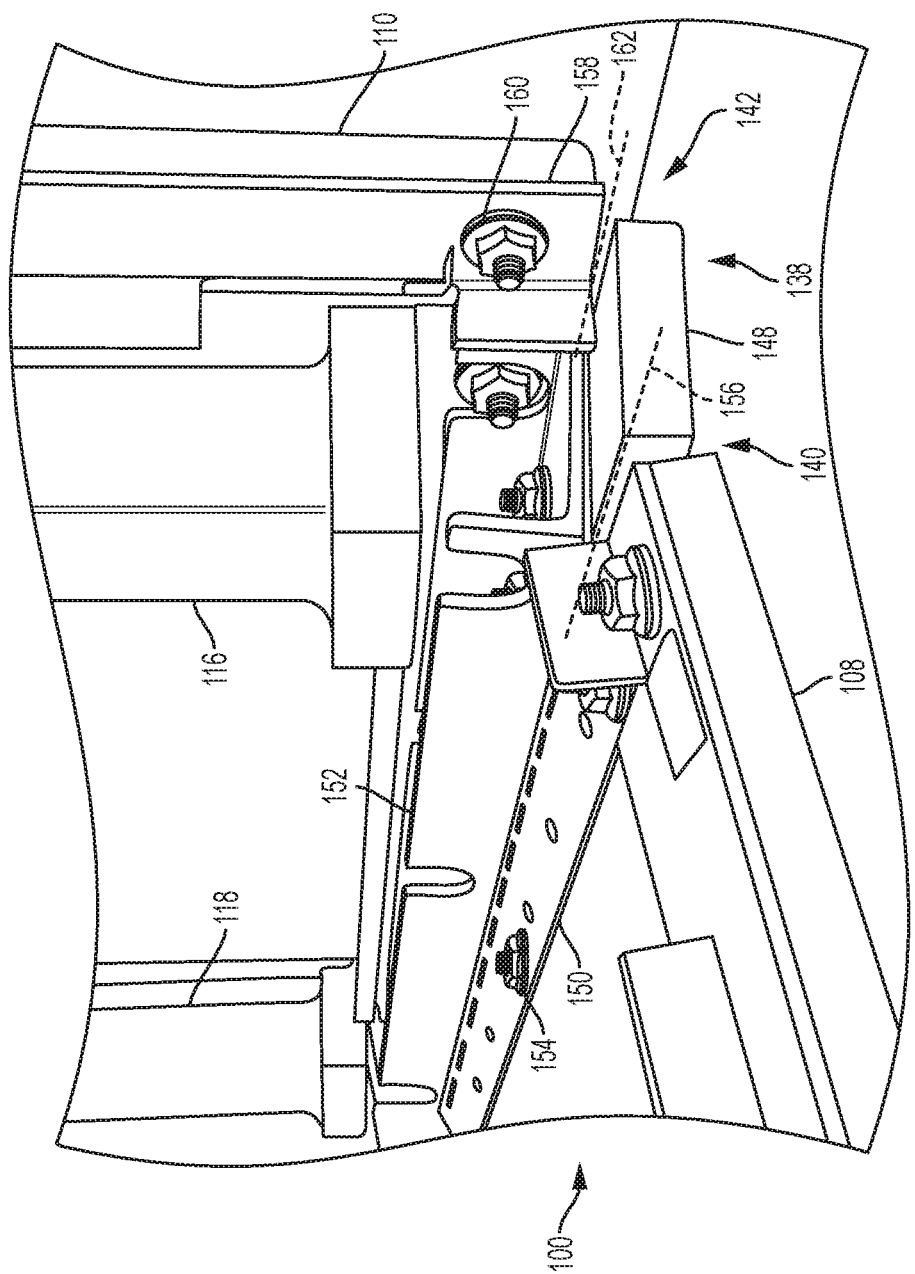
FIG. 8 is a partial perspective view of a compound hinge of the table system of FIG. 1 in an intermediate configuration between the expanded configuration and the storage configuration.
Figure 9:
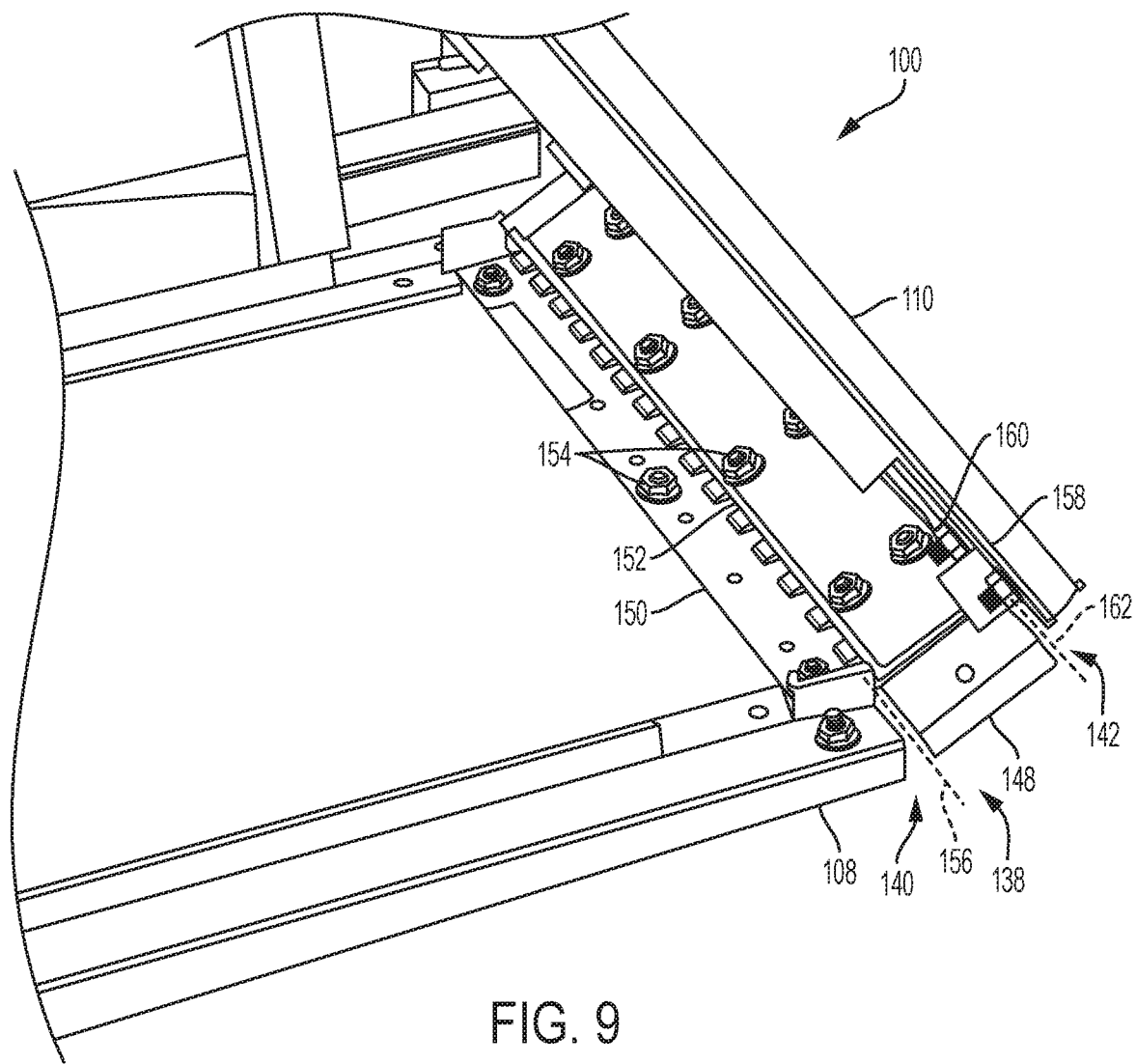
FIG. 9 is another partial perspective view of the compound hinge of the table system of FIG. 1 in another intermediate configuration between the expanded configuration and the storage configuration.
Figure 10:
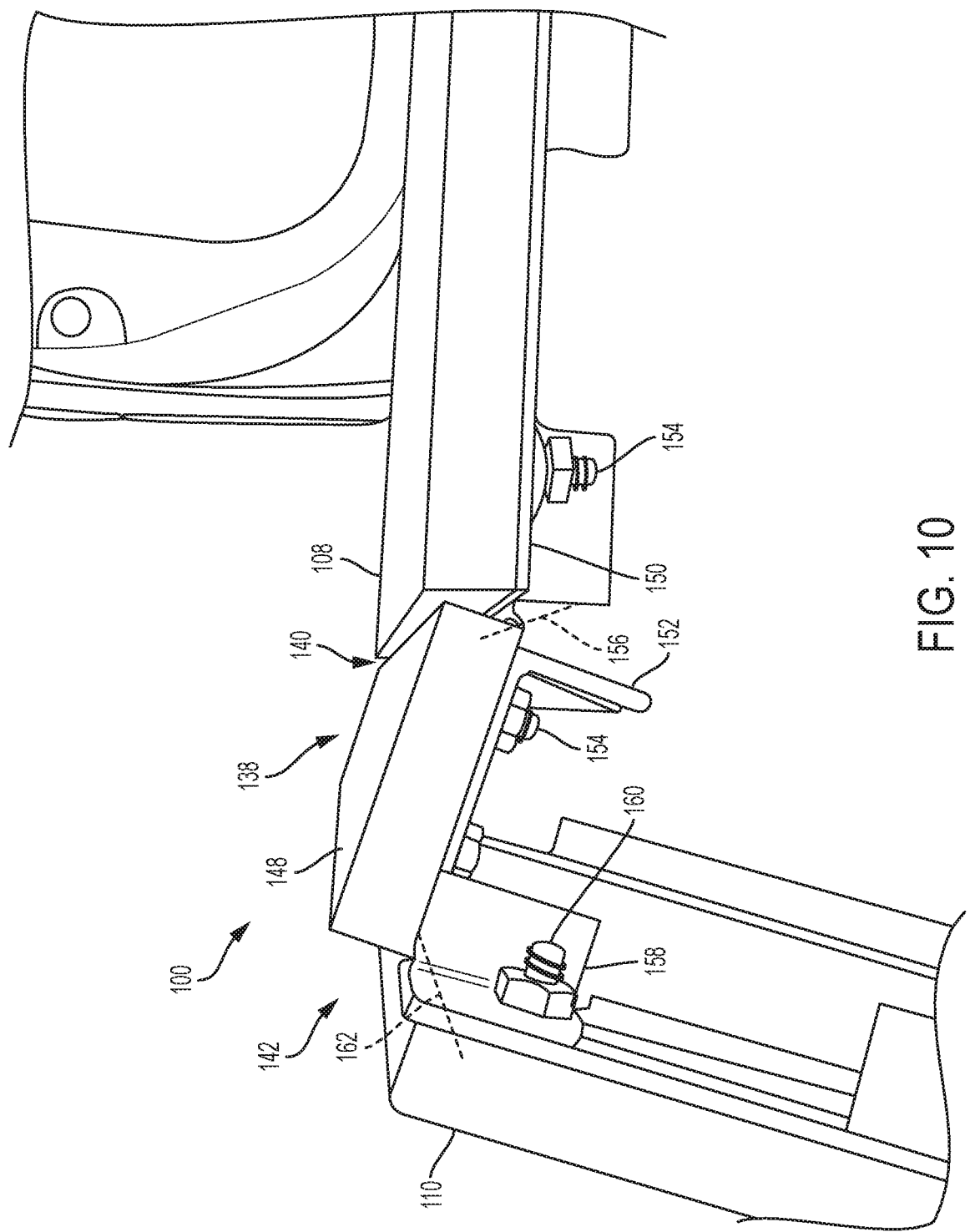
FIG. 10 is another partial perspective view of the compound hinge of the table system of FIG. 1 in another intermediate configuration between the expanded configuration and the storage configuration.

FIGS. 8-10 illustrate the compound hinge assembly 138 that movably couples and facilitates relative pivoting motion of the second and third table elements 108 and 110 about two substantially parallel axes. The compound hinge assembly 138 includes the second hinge 140, which pivotably couples the second table element 108 to the hinge table element 148. The hinge table element 148, together with the table elements 106, 108, and 110, defines a relatively flat table surface in the expanded configuration. That is, as best seen in FIG. 1, the hinge table element 148 is disposed between and can be positioned flush relative to the second table element 108 and the third table element 110 in the expanded configuration. As also shown in FIG. 1, in at least one embodiment, side support brackets 120 and 122 span the lateral sides of the compound hinge assembly 138 to provide support to the hinge table element 148, together with the second table element 108 and third table element 110. The longitudinal length of the side support brackets 120 and 122 can vary as needed to mitigate sagging of the hinge table element 148 and assist in the flush or substantially flush alignment (that is, flush within ±5 degrees) of the upper surfaces of the second table element 108, third table element 110 and hinge table element 148.

In at least one embodiment, the second hinge 140 is defined by interdigitating brackets 150 and 152 that are coupled to the second table element 108 and the hinge table element 148, respectively, via fasteners 154. The second hinge 140 facilitates pivoting motion of the second table element 108 relative to the hinge table element 148 about a second axis 156 that is substantially parallel to the first axis 136 (that is, parallel±10 degrees). Stated another way, the second axis 156 is substantially horizontal and substantially perpendicular to the forward/backward direction of the vehicle 10. The compound hinge assembly 138 also includes the third hinge 142, which pivotably couples the hinge table element 148 to the third table element 110. In at least one embodiment, the third hinge 142 is defined by interdigitating brackets 152 and 158 that are coupled to the second table element 108 and the hinge table element 148, respectively, via fasteners 160. The third hinge 142 facilitates pivoting motion of the hinge table element 148 relative to the third table element 110 about a third axis 162 that is substantially parallel to the first axis 136 (that is, parallel±10 degrees). Stated another way, the third axis 162 is substantially horizontal and substantially perpendicular to the forward/backward direction of the vehicle 10.

Referring specifically to FIG. 8, the hinge table element 148 has a width that is similar to the widest portion of the third and fourth support elements 116 and 118 (for example, the feet) ("similar" meaning equal±10 percent) to both (1) facilitate positioning the third and fourth support elements 116 and 118 between the second table element 108 and the third table element 110 in the storage configuration and (2) provide the table system 100 with a relatively short height in the storage configuration.

Other exemplary embodiments of vehicle-mounted table systems differ from the table system 100 described above. For example and in some embodiments, the axes defined by the hinges may be substantially parallel to each other, but not substantially perpendicular to the forward/backward direction of the vehicle. In some embodiments, the table elements are rotatable relative to each other about one or more axes in addition to those described above. In other embodiments, the table elements are not rotatable relative to each other about one or more axes in addition to those described above.

Various embodiments have been described, which are intended in all respects to be illustrative rather than restrictive. Alternative embodiments will become apparent to those of ordinary skill in the art to which the present invention pertains without departing from its scope. It will be understood that certain features and subcombinations are of utility and may be employed without reference to other features and subcombinations.

What is claimed is:

1. A table system for mounting in a cargo space of a vehicle, the table system comprising:
   a base portion configured to couple to the vehicle within the cargo space of the vehicle;
   a table portion coupled to the base portion, the table portion being movable relative to the base portion from an expanded configuration to a storage configuration and vice versa, the table portion comprising:
      a first table element coupled to the base portion;
      a second table element;
      a first hinge coupling the first table element to the second table element, the first hinge configured to facilitate pivoting the second table element relative to the first table element about a first axis;
      a third table element;
      a compound hinge assembly coupling the second table element to the third table element, the compound hinge assembly comprising:
         a hinge table element;
         a second hinge coupling the second table element to the hinge table element, the second hinge configured to facilitate pivoting the second table element relative to the hinge table element about a second axis, the second axis being substantially parallel to the first axis;
         a third hinge coupling the hinge table element to the third table element, the third hinge configured to facilitate pivoting the third table element relative to the hinge table element about a third axis, the third axis being substantially parallel to the first axis; and
   at least one support element coupled to the table portion and configured to engage the ground.

2. The table system of claim 1, wherein the at least one support element is disposed between the second table element and the third table element in the storage configuration.

3. The table system of claim 2, wherein the at least one support element pivots about a fourth axis relative to the third table element, the fourth axis being substantially parallel to the first axis.

4. The table system of claim 2, wherein the hinge table element has a width that is similar to a widest portion of the at least one support element.

5. The table system of claim 1, wherein the first table element, the second table element, and the third table element are disposed in substantially parallel planes in the storage configuration.

6. The table system of claim 5, wherein the hinge table element is disposed in a substantially perpendicular plane to the first table element, the second table element, and the third table element in the storage configuration.

7. The table system of claim 1, further comprising at least one side support bracket configured to engage a lateral side of at least one of the second table element, third table element and the hinge table element.

8. The table system of claim 7, wherein the at least one side support bracket is configured to maintain the second table element, the third table element and the hinge element in substantially parallel planes in the expanded configuration.

9. The table system of claim 7, wherein the at least one side support bracket detachably couples to the table portion.

10. The table system of claim 1, wherein the first table element, the second table element, and the third table element are disposed in substantially parallel planes in the expanded configuration.

11. The table system of claim 1, wherein the first table element, the second table element, the third table element, and the hinge table element are disposed in substantially parallel planes in the expanded configuration.

12. The table system of claim 1, wherein the table portion is translatable relative to the base portion from the expanded configuration to the storage configuration and vice versa.

13. The table system of claim 1, wherein the at least one support element is a first support element, and further comprising a second support element coupled to the table portion and configured to engage the ground.

14. The table system of claim 13, wherein the second support element pivots about a fourth axis relative to the first table element.

\* \* \* \* \*